(12) United States Patent
Hu (10) Patent No.: US 9,654,010 B2
(45) Date of Patent: May 16, 2017

(54) POWER CONVERTER CIRCUITRY WITH SWITCHING FREQUENCY CONTROL CIRCUITRY

(71) Applicant: Cree, Inc., Durham, NC (US)

(72) Inventor: Qingcong Hu, Morrisville, NC (US)

(73) Assignee: Cree, Inc., Durham, NC (US)

( * ) Notice: Subject to any disclaimer, the term of this patent is extended or adjusted under 35 U.S.C. 154(b) by 104 days.

(21) Appl. No.: 14/558,214

(22) Filed: Dec. 2, 2014

(65) Prior Publication Data
US 2016/0156269 A1  Jun. 2, 2016

(51) Int. Cl.
  *H02M 3/335*  (2006.01)
  *H05B 33/08*  (2006.01)
  *H02M 1/44*  (2007.01)
  *H02M 1/00*  (2006.01)

(52) U.S. Cl.
  CPC ......... *H02M 3/33507* (2013.01); *H02M 1/44* (2013.01); *H05B 33/0815* (2013.01); *H02M 2001/0058* (2013.01); *Y02B 70/1491* (2013.01)

(58) Field of Classification Search
  CPC ............. H02M 3/335; H02M 3/33507; H02M 3/33523; H02M 2001/0048
  See application file for complete search history.

(56) References Cited

U.S. PATENT DOCUMENTS

| 5,841,643 A | * | 11/1998 | Schenkel | .......... | H02M 3/33507 323/282 |
| 7,778,051 B2 | * | 8/2010 | Yang | .................. | H02M 3/33507 363/21.16 |
| 2015/0123565 A1 | | 5/2015 | Hu | | |

* cited by examiner

*Primary Examiner* — Gary L Laxton
(74) *Attorney, Agent, or Firm* — Anthony J. Josephson (57) ABSTRACT

Driver circuitry includes power converter circuitry, switching control circuitry, and switching frequency limiting circuitry. The power converter circuitry is configured to receive and selectively provide an input signal to one or more power conversion components via a power converter switching element to produce a regulated output signal. The switching control circuitry is coupled to the power converter switching element and configured to provide a switching control signal for controlling the power converter switching element based on a frequency limited switching trigger signal. The switching frequency limiting circuitry is coupled to the power converter circuitry and the switching control circuitry and configured to receive a switching indicator signal from the power converter circuitry and provide the frequency limited switching trigger signal based on the switching indicator signal and the switching control signal such that the frequency limited switching trigger signal limits the frequency of the switching control signal.

22 Claims, 8 Drawing Sheets

POWER CONVERTER CIRCUITRY WITH SWITCHING FREQUENCY CONTROL CIRCUITRY

FIELD OF THE DISCLOSURE

The present disclosure relates to power converter circuitry, and specifically to circuitry for limiting the switching frequency of power converter circuitry.

BACKGROUND

Continuing advancements in solid-state lighting technologies, and specifically light-emitting diodes (LEDs), continue to result in remarkable performance improvements when compared to their incandescent and fluorescent counterparts. Generally, LED-based lighting fixtures are more efficient, last longer, are more environmentally friendly, and require less maintenance than incandescent and fluorescent lighting fixtures. Accordingly, LEDs are poised to replace conventional lighting technologies in applications such as traffic lights, automobiles, general-purpose lighting, and liquid-crystal-display (LCD) backlighting.

LED lighting fixtures may be driven by a linear (i.e., direct current) driver signal or a pulse-width modulated (PWM) driver signal. Since most lighting fixtures receive power from an alternating current (AC) power source, power conversion must be performed in order to produce the linear driver signal or PWM driver signal for driving the LED lighting fixture. While the color of light emitted from an LED primarily depends on the composition of the material used to fabricate the LED, the light output of an LED is directly related to the current flowing through the P-N junction of the LED. Accordingly, driver circuitry capable of providing a constant current is desirable for an LED lighting fixture.

Figure 1:
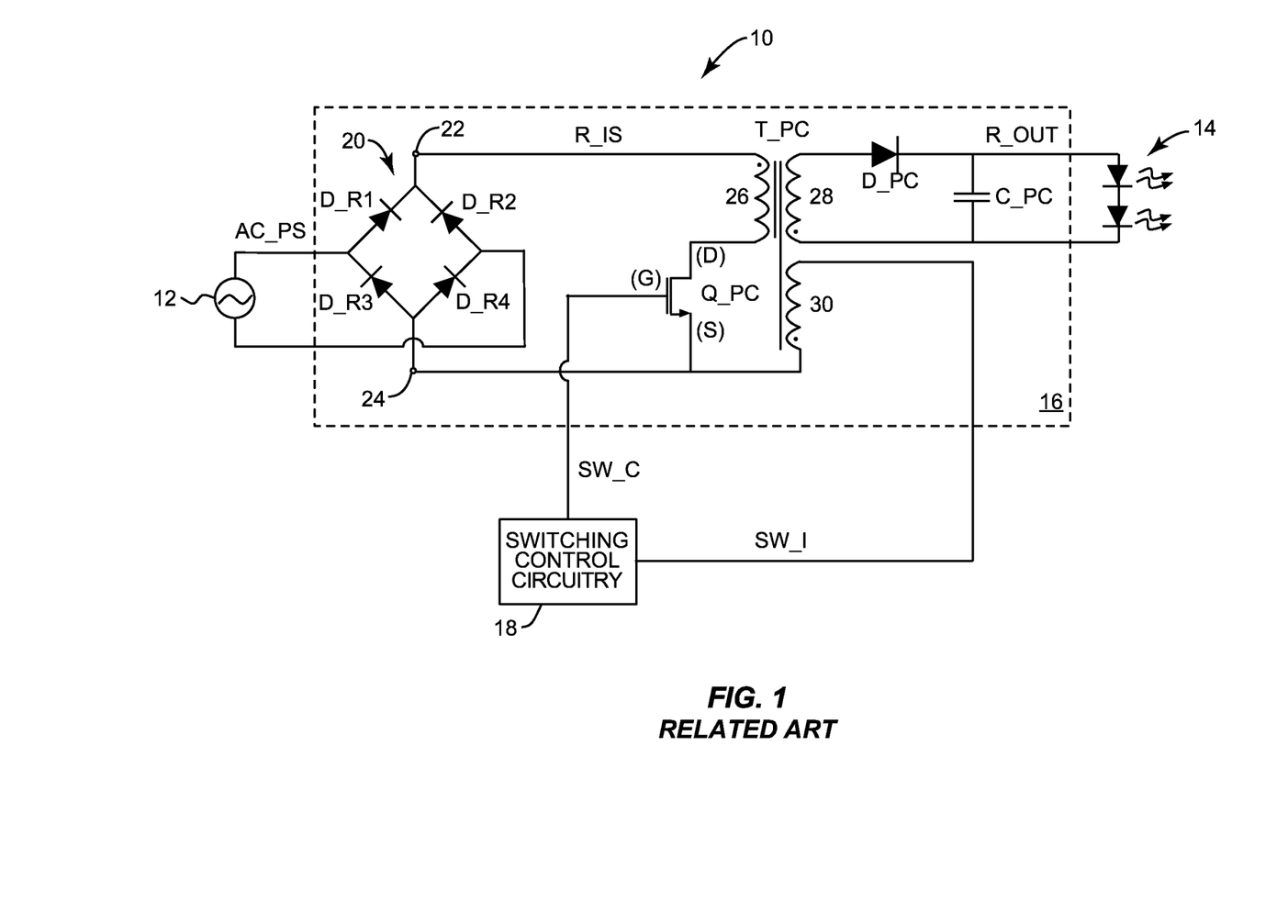
FIG. 1 is a schematic illustrating conventional driver circuitry.

FIG. 1 shows conventional driver circuitry 10 for an LED lighting fixture. For context, an AC power source 12 and an LED light source 14 are also shown. The conventional driver circuitry 10 includes power converter circuitry 16 and switching control circuitry 18 coupled to the power converter circuitry 16. The power converter circuitry 16 includes a bridge rectifier 20, a power converter switching element Q_PC, a power converter transformer T_PC, a power converter diode D_PC, and a power converter output capacitor C_PC. The bridge rectifier 20 includes a first rectifier diode D_R1 with a cathode coupled to a first rectifier output node 22 and an anode coupled to a positive output of the AC power source 12, a second rectifier diode D_R2 with a cathode coupled to the first rectifier output node 22 and an anode coupled to a negative output of the AC power source 12, a third rectifier diode D_R3 with a cathode coupled to the positive output of the AC power source 12 and an anode coupled to a second rectifier output node 24, and a fourth rectifier diode D_R4 with a cathode coupled to the negative output of the AC power source 12 and an anode coupled to the second rectifier output node 24. The power converter transformer T_PC includes a primary winding 26 coupled in series with the power converter switching element Q_PC between the first rectifier output node 22 and the second rectifier output node 24. Further, the power converter transformer T_PC includes a secondary winding 28 coupled in parallel with the power converter output capacitor C_PC and the LED light source 14 and an auxiliary winding 30 coupled between the second rectifier output node 24 and the switching control circuitry 18. The power converter diode D_PC is coupled between the secondary winding 28 of the power converter transformer T_PC and the power converter output capacitor C_PC. The switching control circuitry 18 is further coupled to the power converter switching element Q_PC.

The second rectifier output node 24 is typically used as a ground for the switching control circuitry 18. The power converter switching element Q_PS may be a metal-oxide-semiconductor field-effect transistor (MOSFET). Accordingly, a drain contact (D) of the power converter switching element Q_PS may be coupled to the primary winding 26 of the power converter transformer T_PC, a source contact (S) of the power converter switching element Q_PS may be coupled to the second rectifier output node 24, and a gate contact (G) of the power converter switching element Q_PS may be coupled to the switching control circuitry 18.

In operation, an AC power supply signal AC_PS is received and rectified by the bridge rectifier 20 to provide a rectified input signal R_IS to the primary winding 26 of the power converter transformer T_PC. The power converter switching element Q_PC receives a switching control signal SW_C from the switching control circuitry 18, which modulates the state of the power converter switching element Q_PC. When the power converter switching element Q_PC is in an ON state, the rectified input signal R_IS flows through the primary winding 26 of the power converter transformer T_PC, resulting in a storage of energy in the primary winding 26 via a build-up of magnetic flux. A voltage induced in the secondary winding 28 is negative, such that the power converter diode D_PC is reverse biased and the power converter output capacitor C_PC supplies power to the LED light source 14. When the power converter switching element Q_PC is in an OFF state, the magnetic field of the primary winding 26 begins to collapse, such that the primary winding 26 induces a positive voltage in the secondary winding 28, thereby forward biasing the power converter diode D_PC and providing power to the power converter output capacitor C_PC and the LED light source 14. The auxiliary winding 30 receives a similar signal to the secondary winding 28, and thus is used to indirectly measure the characteristics of the primary winding 26 and/or the secondary winding 28. Energy from the secondary winding 28 is placed across the power converter output capacitor C_PC where it is smoothed and delivered to the LED light source 14 as a regulated driver output signal R_OUT. A voltage signal from the auxiliary winding 30 is delivered to the switching control circuitry 18 as a switching indicator signal SW_I, which is used by the switching control circuitry 18 to modulate the switching control signal SW_C.

The switching control circuitry 18 may modulate the switching control signal SW_C in many different ways. In a first mode of operation, the switching control circuitry 18 may provide the switching control signal SW_C such that the energy stored in the power converter transformer T_PC never falls to zero. In this case, the conventional driver circuitry 10 is said to operate in a continuous conduction mode (CCM). In a second mode of operation, the switching control circuitry 18 may provide the switching control signal SW_C such that the energy stored in the power converter transformer T_PC falls to zero and remains at zero for some period of time (i.e., "dead time") before ramping back up. Specifically, neither the primary winding 26 nor the secondary winding 28 is conducting during the dead time of the power converter transformer T_PC. In this case, the conventional driver circuitry 10 is said to operate in a discontinuous conduction mode (DCM). In a third mode of operation, the switching control circuitry 18 may provide the switching control signal SW_C such that the energy stored in the power converter transformer T_PC immediately begins to ramp up after falling to zero. Specifically, the primary winding 26 of the power converter transformer T_PC begins to conduct current immediately after the current through the secondary winding 28 decreases to zero. In this case, the conventional driver circuitry 10 is said to operate in a critical or boundary conduction mode (BCM).

Operation in a discontinuous conduction mode (DCM) is preferred in many situations, especially for medium to low power applications. Because the power converter switching element Q_PC is turned on only when the power converter diode D_PC is not conducting current, the power loss due to the reverse recovery effect of the power converter diode D_PC can be eliminated, which may lead to significant efficiency improvements for high voltage applications. For off-the-grid applications where high power factor (PF) is required, discontinuous conduction mode (DCM) is an easy way to achieve a unity power factor (PF) with flyback converters, buck-boost converters, single-ended primary-inductor converters (SEPICs), and other up-down converters. However, operating in a discontinuous conduction mode (DCM) increases the root mean square (RMS) values of currents in a converter, which results in an increase of conduction power loss. In order to limit the increase of conduction loss due to operation in a discontinuous conduction mode (DCM), the dead time when neither the power converter switching element Q_PC nor the power converter diode D_PC are conducting should be minimized. With a dead time of zero, operation in a critical or boundary conduction mode (BCM) provides an advantage of lower conduction loss when compared to a discontinuous conduction mode (DCM). However, switching losses in boundary conduction modes (BCM) are higher than those in discontinuous conduction modes (DCM) due to higher switching frequencies.

In an effort to mitigate the interference and excessive switching losses discussed above with respect to the conventional driver circuitry 10 in FIG. 1, minimum off-time circuitry 32 has been used along with conventional driver circuitry 10, as discussed in copending U.S. patent application Ser. No. 14/071,733 and shown in FIG. 2. The minimum off-time circuitry 32 is coupled between the switching control circuitry 18 and the auxiliary winding 30 of the power converter transformer T_PC, such that the minimum off-time circuitry 32 receives the switching indicator signal SW_I from the auxiliary winding 30 and the switching control signal SW_C from the switching control circuitry 18 and provides an off-time limited switching trigger signal SW_T to the switching control circuitry 18. Notably, the switching control circuitry 18 is generally a pre-made critical or boundary conduction mode switching controller such as the L656X series of switching controllers made by STMicroelectronics, Inc. of Geneva, Switzerland. Accordingly, the adjustability of the switching control circuitry 18 may be minimal, such that the switching control circuitry 18 is configured to turn ON the power converter switching element Q_PC whenever the current of the switching indicator signal SW_I normally provided to the switching control circuitry 18 drops below zero. Instead of directly providing the switching indicator signal SW_I to the switching control circuitry 18 in FIG. 2, the minimum off-time circuitry 32 alters the switching indicator signal SW_I with reference to the switching control signal SW_C to provide the off-time limited switching trigger signal SW_T, which effectively allows the switching indicator signal SW_I to drop below zero for some period of time before the switching control circuitry 18 switches the power converter switching element Q_PC back ON.

Figure 2:
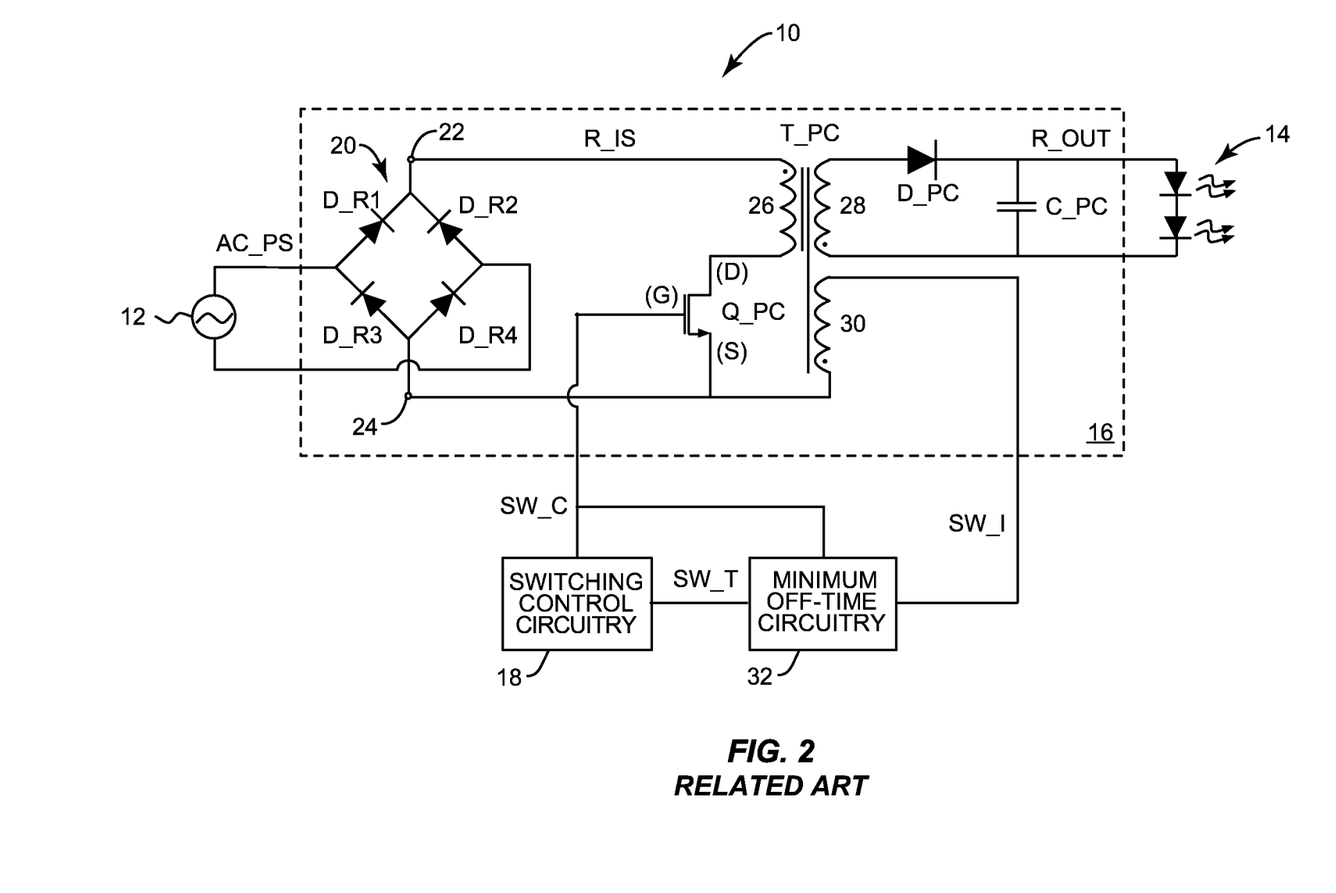
FIG. 2 is a schematic illustrating alternative conventional driver circuitry.

When the conduction time of the power converter diode D_PC is above a predetermined threshold such that interference and switching losses in the conventional power converter circuitry 10 are relatively low, the minimum off-time circuitry 32 may directly provide the switching indicator signal SW_I as the off-time limited switching trigger signal SW_T such that the conventional driver circuitry 10 operates in a critical or boundary conduction mode. However, when the conduction time of the power converter diode D_PC is above a predetermined threshold such that interference and switching losses may be problematic, the minimum off-time circuitry 32 may alter the switching indicator signal SW_I and provide the modified signal as the off-time limited switching trigger signal SW_T such that the conventional power converter circuitry 10 operates in a discontinuous conduction mode, wherein the off-time of the switching control signal SW_C and thus the power converter switching element Q_SW is contained at a minimum value. Accordingly, the conventional power converter circuitry 10 may advantageously operate in a combination of a boundary conduction mode (BCM) and a discontinuous conduction mode (DCM) through an AC line cycle, thereby providing an opportunity to optimize the performance of the system.

Figure 3:
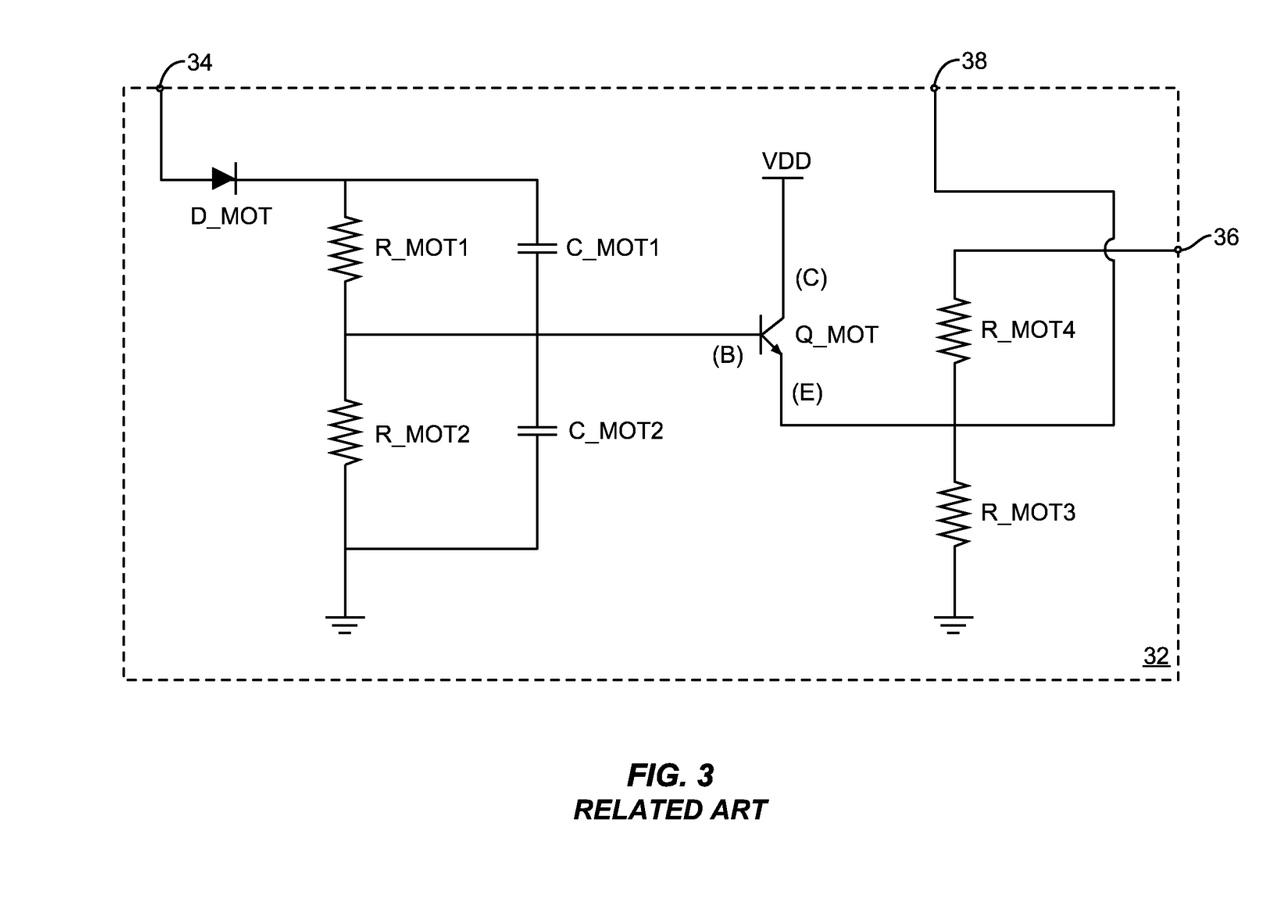
FIG. 3 is a schematic illustrating details of minimum off-time circuitry shown in the conventional driver circuitry of FIG. 2.

FIG. 3 shows details of the minimum off-time circuitry 32 discussed above. The minimum off-time circuitry 32 includes a minimum off-time diode D_MOT, a number of minimum off-time resistors R_MOT, a number of minimum off-time capacitors C_MOT, and a minimum off-time switching element Q_MOT. The minimum off-time diode D_MOT is coupled in series with a first minimum off-time resistor R_MOT1 between a first input node 34 of the minimum off-time circuitry 32 and a base contact (B) of the minimum off-time switching element Q_MOT. A second minimum off-time resistor R_MOT2 is coupled between the base contact (B) of the minimum off-time switching element Q_MOT and ground. A first minimum off-time capacitor C_MOT1 is coupled in parallel with the first minimum off-time resistor R_MOT between the minimum off-time diode D_MOT and the base contact (B) of the minimum off-time switching element Q_MOT. A second minimum off-time capacitor C_MOT2 is coupled in parallel with the second minimum off-time resistor R_MOT2 between the base contact (B) of the minimum off-time switching element Q_MOT and ground. A collector contact (C) of the minimum off-time switching element Q_MOT is coupled to a supply voltage VDD. An emitter contact (E) of the minimum off-time switching element Q_MOT is coupled to ground via a third minimum off-time resistor R_MOT3 and additionally coupled to an output node 38 of the minimum off-time circuitry 32. A fourth minimum off-time resistor R_MOT4 is coupled between a second input node 36 of the minimum off-time circuitry 32 and the emitter contact (E) of the minimum off-time switching element Q_MOT.

Figure 4:
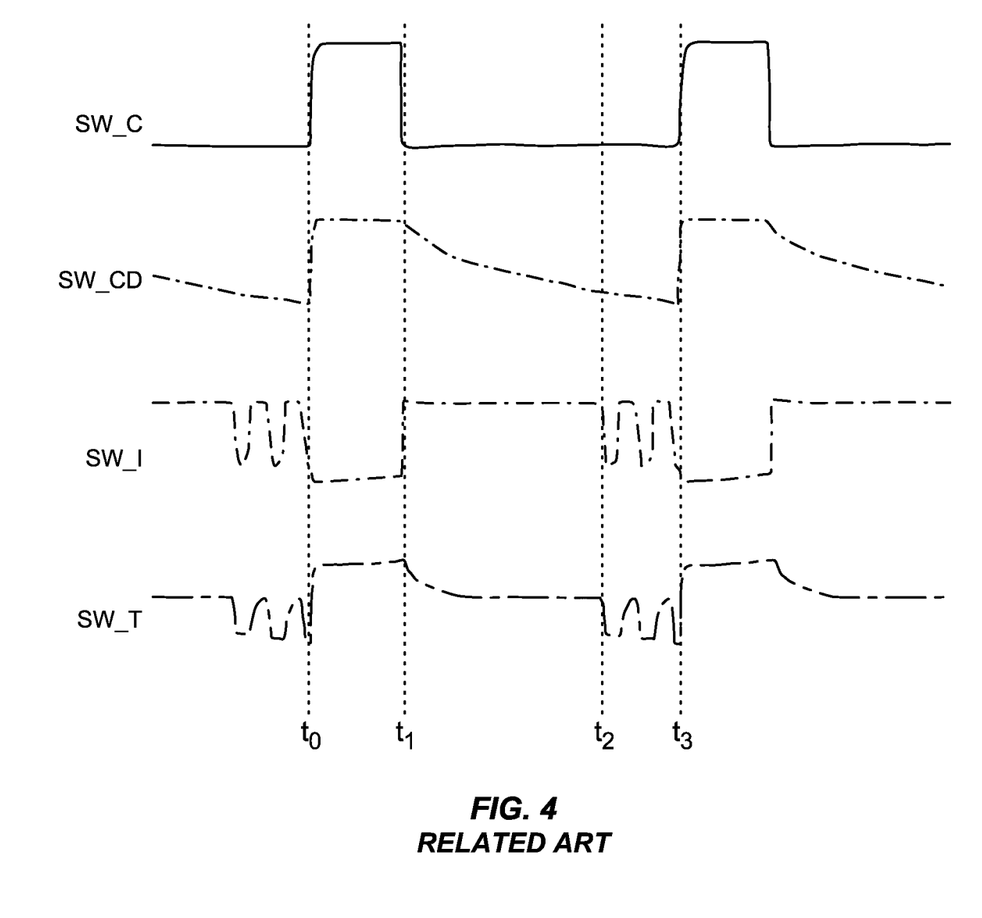
FIG. 4 is a graph illustrating one or more operational parameters of the minimum off-time circuitry shown in FIG. 3.

The operation of the minimum off-time circuitry 32 is now described with reference to FIG. 4, which illustrates waveforms of the various signals in the circuitry. The minimum off-time circuitry 32 receives the switching control signal SW_C at the first input node 34 and the switching indicator signal SW_I at the second input node 36. The RC network created by the first minimum off-time resistor R_MOT1, the second minimum off-time resistor R_MOT2, the first minimum off-time capacitor C_MOT1, and the second minimum off-time capacitor C_MOT2 results in a controlled decay of the switching control signal SW_C, which is presented as a decayed switching control signal SW_CD to the base contact (B) of the minimum off-time switching control element Q_MOT. As shown in FIG. 4, the switching control signal SW_C is a square wave signal, while the decayed switching control signal SW_CD includes a plateau corresponding with the ON time of the switching control signal SW_C followed by a ramping decline starting when the switching control signal SW_C transitions from high to low. When the switching control signal SW_C is high, the first minimum off-time capacitor C_MOT1 and the second minimum off-time capacitor C_MOT2 are charged, and the minimum off-time switching element Q_MOT is turned ON by the divided voltage across the first minimum off-time resistor R_MOT1 and the second minimum off-time resistor R_MOT2, thereby clamping the off-time limited switching trigger signal SW_T high by the base-to-emitter voltage of the minimum off-time switching element Q_MOT induced by the decayed switching control signal SW_CD. Closing the power converter switching element Q_PC effectively shorts the primary winding 26 of the power converter transformer T_PC to ground, as shown by the sharp dip in the switching indicator signal SW_I at time $t_0$. Magnetic flux then builds in the primary winding 26 of the power converter transformer T_PC, resulting in a small ramping increase in the switching indicator signal SW_I between time $t_0$ and $t_1$, which in turn increases the magnitude of the off-time limited switching trigger signal SW_T.

As the off-time limited switching trigger signal SW_T reaches a desired magnitude at time $t_1$, the switching control circuitry 18 transitions the switching control signal SW_C from high to low. Although though the switching control signal SW_C is low at this point, the stored voltage in the first minimum off-time capacitor C_MOT1 and the second minimum off-time capacitor C_MOT2 begin to discharge into the base contact (B) of the minimum off-time switching element Q_MOT, thereby continuing to keep the device ON until the voltage supplied by the minimum off-time capacitors decays below the threshold voltage of the device. At some point during the off-time of the switching control signal SW_C and thus the power converter switching element Q_PC, the magnetic field of the primary winding 26 of the power converter transformer T_PC decays below a certain threshold, such that the power delivered to the secondary winding 28 and the auxiliary winding 30 as measured by the switching indicator signal SW_I drops significantly and begins to resonate, as shown starting at time $t_2$. The switching period of the switching control signal SW_C due to the minimum off-time circuitry 32 is therefore described by Equation (1):

$$t_s = t_{on} + t_{off} = t_{on} + R_{MOT1} C_{MOT2} \ln\left(\frac{V_{BO}}{V_{BF}}\right) \quad (1)$$

where $t_S$ is the switching period of the switching control signal SW_C, $t_{on}$ is the ON time of the switching control signal SW_C, $t_{off}$ is the OFF time of the switching control signal SW_C, $V_{BO}$ is the initial voltage of the decayed switching control signal SW_CD at the base contact (B) of the minimum off-time switching element Q_MOT when the switching control signal SW_C transitions from low to high, and $V_{BF}$ is the final voltage of the decayed switching control signal SW_CD just before the next transition of the switching control signal SW_C from low to high again at time $t_3$.

The off-time limited switching trigger signal SW_T tracks the switching indicator signal SW_I, but further receives a scaled version of the decayed switching control signal SW_CD due to the base-to-emitter voltage of the minimum off-time switching element Q_MOT. The base-to-emitter voltage of the minimum off-time switching element Q_MOT therefore effectively clamps the switching trigger signal SW_T above a predetermined threshold, such that the switching trigger signal SW_T will not trigger the beginning of a new cycle in the switching control circuitry 18 until a desired amount of off-time has been achieved. The desired amount of off-time may be altered by setting the component values of the first minimum off-time resistor R_MOT1, the second minimum off-time resistor R_MOT2, the first minimum off-time capacitor C_MOT1, and the second minimum off-time capacitor C_MOT2, such that the decay rate of the decayed switching control signal SW_CD provides a desired response.

While the minimum off-time circuitry 32 discussed above reduces excessive interference and switching losses at high switching frequencies, interference and switching losses may still occur due to high frequency transitions in the ON period of the switching control signal SW_C. Further, the minimum off-time circuitry 32 discussed above may suffer from time mismatch and reliability issues due to a relatively large area in the switching cycle over which the minimum off-time circuitry 32 may cause the switching control circuitry 18 to begin a new cycle. The time mismatch and reliability issues may result in a shorter than desired off-time and a failure to provide the off-time limited switching trigger signal SW_T such that the power converter switching element Q_PC is switched ON during a resonant valley of the switching indicator signal SW_I and thus a zero or low current condition of the primary winding 26 of the power converter transformer T_PC in some situations. Failing to provide the off-time limited switching trigger signal SW_T such that the power converter switching element Q_PC is switched ON during a resonant valley of the switching indicator signal SW_I and thus a zero or low current condition of the primary winding 26 of the power converter transformer T_PC may result in excess switching losses that degrade the efficiency of the conventional power converter circuitry 10. Accordingly, there is a need for a switching control scheme that reliably provides further reductions in interference and switching losses at high frequencies.

SUMMARY

The present disclosure relates to power converter circuitry, and specifically to circuitry for limiting the switching frequency of power converter circuitry. In one embodiment, driver circuitry includes power converter circuitry, switching control circuitry, and switching frequency limiting circuitry. The power converter circuitry is configured to receive and selectively provide an input signal to one or more power conversion components via a power converter switching element to produce a regulated output signal. The switching control circuitry is coupled to the power converter switching element and configured to provide a switching control signal for controlling the power converter switching element based on a frequency limited switching trigger signal. The switching frequency limiting circuitry is coupled to the power converter circuitry and the switching control circuitry and configured to receive a switching indicator signal from the power converter circuitry and provide the frequency limited switching trigger signal based on the switching indicator signal and the switching control signal such that the frequency limited switching trigger signal limits the frequency of the switching control signal.

In an additional embodiment, a lighting fixture includes a solid state light source and driver circuitry coupled to the solid-state light source. The solid state light source includes a number of light emitting diodes (LEDs). The driver circuitry includes power converter circuitry, switching control circuitry, and switching frequency limiting circuitry. The power converter circuitry is configured to receive and selectively provide an input signal to one or more power conversion components via a power converter switching element to produce a regulated output signal, which is provided to the solid-state light source. The switching control circuitry is coupled to the power converter switching element and configured to provide a switching control signal for controlling the power converter switching element based on a frequency limited switching trigger signal. The switching frequency limiting circuitry is coupled to the power converter circuitry and the switching control circuitry and configured to receive a switching indicator signal from the power converter circuitry and provide the frequency limited switching trigger signal based on the switching indicator signal and the switching control signal such that the frequency limited switching trigger signal limits the frequency of the switching control signal.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 5:
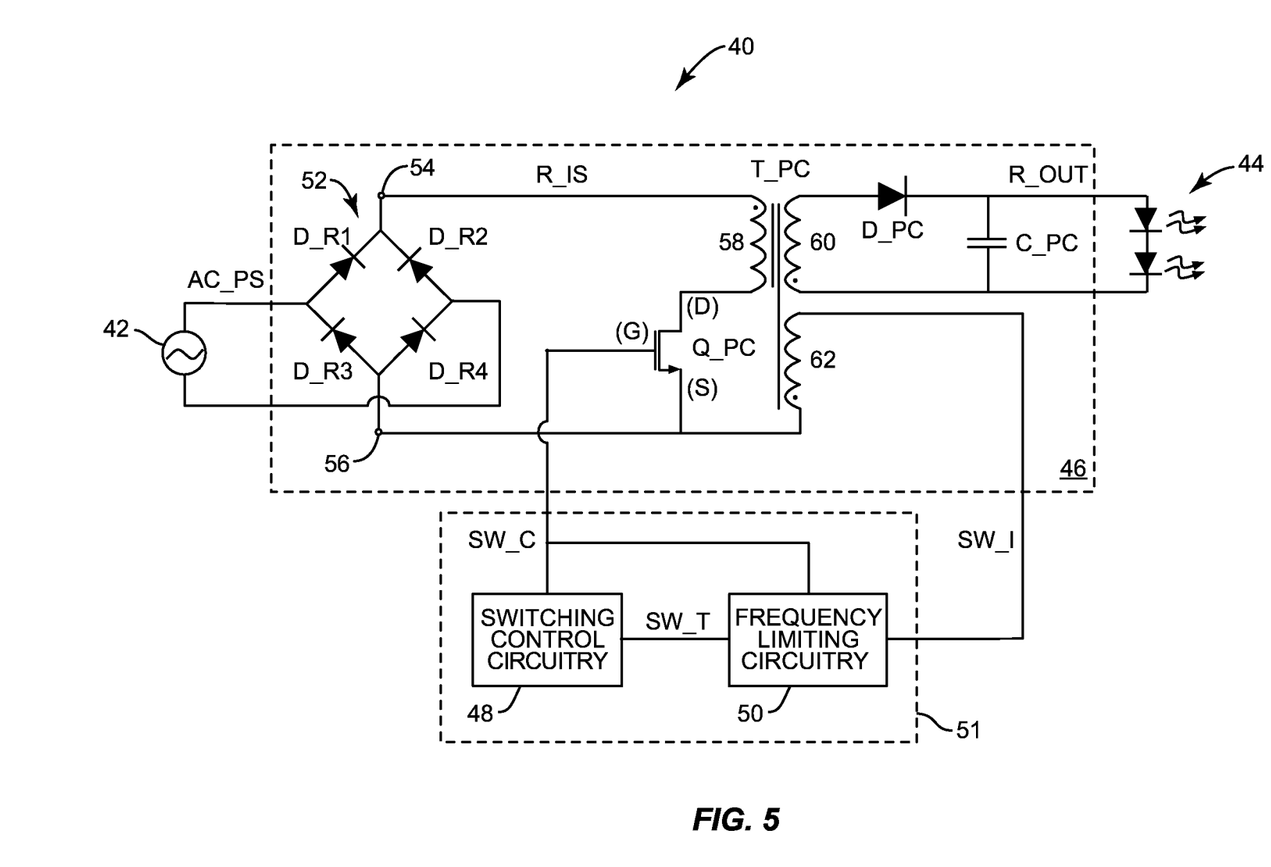
FIG. 5 is a schematic illustrating driver circuitry including frequency limiting circuitry according to one embodiment of the present disclosure.

FIG. 5 shows driver circuitry 40 according to one embodiment of the present disclosure. For context, an AC power source 42 and an LED light source 44 are also shown. The driver circuitry 40 includes power converter circuitry 46, switching control circuitry 48, and frequency limiting circuitry 50. Together, the switching control circuitry 48 and the frequency limiting circuitry 50 may be referred to as frequency-limited switching control circuitry 51, and the functionality thereof may be combined into a single component in some embodiments. The power converter circuitry 46 includes a bridge rectifier 52, a power converter switching element Q_PC, a power converter transformer T_PC, and a power converter output capacitor C_PC. The bridge rectifier 52 includes a first rectifier diode D_R1 with a cathode coupled to a first rectifier output node 54 and an anode coupled to a positive output of the AC power source 42, a second rectifier diode D_R2 with a cathode coupled to the first rectifier output node 54 and an anode coupled to a negative output of the AC power source 42, a third rectifier diode D_R3 with a cathode coupled to the positive output of the AC power source 42 and an anode coupled to a second rectifier output node 56, and a fourth rectifier diode D_R4 with a cathode coupled to the negative output of the AC power source 42 and an anode coupled to the second rectifier output node 56. The power converter transformer T_PC includes a primary winding 58 coupled in series with the power converter switching element Q_PC between the first rectifier output node 54 and the second rectifier output node 56. Further, the power converter transformer T_PC includes a secondary winding 60 coupled to a power converter diode D_PC and an auxiliary winding 62 coupled between the second rectifier output node 56 and the frequency limiting circuitry 50. The power converter diode D_PC is coupled to the power converter output capacitor C_PC and the LED light source 44. The switching control circuitry 48 is further coupled to the power converter switching element Q_PC. The frequency limiting circuitry 50 is coupled between the auxiliary winding 62 of the power converter transformer T_PC and the switching control circuitry 48.

The second rectifier output node 56 is typically used as ground for the switching control circuitry 48. The power converter switching element Q_PS may be a metal-oxide-semiconductor field-effect transistor (MOSFET). Accordingly, a drain contact (D) of the power converter switching element Q_PS may be coupled to the primary winding 58 of the power converter transformer T_PC, a source contact (S) of the power converter switching element Q_PS may be coupled to the second rectifier output node 56, and a gate contact (G) of the power converter switching element Q_PS may be coupled to the switching control circuitry 48.

In operation, an AC power supply signal AC_PS is received and rectified by the bridge rectifier 52 to provide a rectified input signal R_IS to the primary winding 58 of the power converter transformer T_PC. The power converter switching element Q_PC receives a switching control signal SW_C from the switching control circuitry 48, which modulates the state of the power converter switching element Q_PC. When the power converter switching element Q_PC is in an ON state, the rectified input signal R_IS flows through the primary winding 58 of the power converter transformer T_PC, resulting in a storage of energy in the primary winding 58 via a build-up of magnetic flux. A voltage induced in the secondary winding 60 is negative, such that the power converter diode D_PC is reverse biased and the power converter output capacitor C_PC supplies power to the LED light source 44. When the power converter switching element Q_PC is in an OFF state, the magnetic field of the primary winding 58 begins to collapse, such that the primary winding 58 induces a positive voltage in the secondary winding 60, thereby forward biasing the power converter diode D_PC and providing power to the power converter output capacitor C_PC and the LED light source 44. The auxiliary winding 62 receives a similar signal to the secondary winding 60, and thus is used to indirectly measure the characteristics of the primary winding 58 and/or the secondary winding 60. Energy from the secondary winding 60 is placed across the power converter output capacitor C_PC where it is smoothed and delivered to the LED light source 44 as a regulated driver output signal R_OUT. A voltage signal from the auxiliary winding 62 is delivered to the frequency limiting circuitry 50 as a switching indicator signal SW_I, which is used by the frequency limiting circuitry 50 along with the switching control signal SW_C to provide a frequency limited switching trigger signal SW_T to the switching control circuitry 48.

When the frequency of the switching control signal SW_C is below a predetermined threshold in which interference and/or switching losses are not deemed problematic, the frequency limiting circuitry 50 may forward the switching indicator signal SW_I as the frequency limited switching trigger signal SW_T directly to the switching control circuitry 48. The switching control circuitry 48 may be a pre-made critical or boundary conduction mode switching controller such as the L656X series of switching controllers made by STMicroelectronics, Inc. of Geneva, Switzerland. Accordingly, at frequencies of the switching control signal SW_C that are below a predetermined threshold, the switching control circuitry 48 may operate in a critical or boundary conduction mode. When the frequency of the switching control signal SW_C is high enough such that problematic interference and/or switching losses begin to occur, the frequency limiting circuitry 50 may alter one or more parameters of the switching indicator signal SW_I and forward the modified signal as the frequency limited switching trigger signal SW_T to the switching control circuitry 48 such that the overall frequency of the switching control signal SW_C is limited, as discussed in detail below.

Although the switching control circuitry 48 and the frequency limiting circuitry 50 are shown separately in FIG. 5, the disclosure is not so limited. That is, the functionality of the switching control circuitry 48 and the frequency limiting circuitry 50 may be combined into a single module without departing from the principles described herein.

Figure 6:
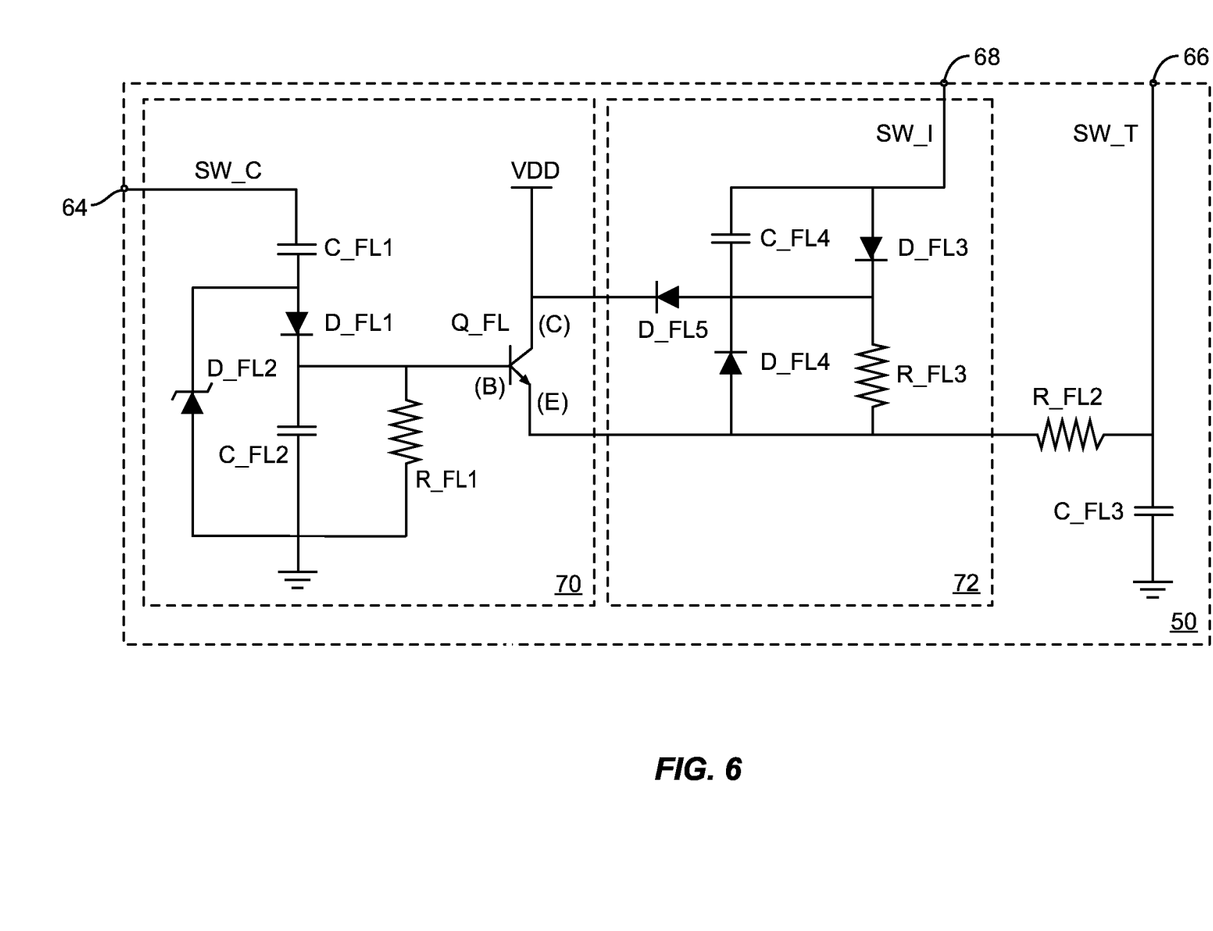
FIG. 6 is a schematic illustrating details of the frequency limiting circuitry shown in FIG. 5 according to one embodiment of the present disclosure.

FIG. 6 shows details of frequency limiting circuitry 50 according to one embodiment of the present disclosure. The frequency limiting circuitry 50 includes a first frequency limiting capacitor C_FL1 and a first frequency limiting diode D_FL1 coupled in series between a first input node 64 and a base contact (B) of a frequency limiting switching element Q_FL, such that an anode of the first frequency limiting diode D_FL1 is coupled to the first frequency limiting capacitor C_FL1 and a cathode of the first frequency limiting diode D_FL1 is coupled to the base contact (B) of the frequency limiting switching element Q_FL. A second frequency limiting capacitor C_FL2 is coupled between the base contact (B) of the frequency limiting switching element Q_FL and ground. A second frequency limiting diode D_FL2, which may be a Zener diode, is coupled such that its anode is coupled to ground and its cathode is coupled to the first frequency limiting capacitor C_FL1 and the anode of the first frequency limiting diode D_FL1. A first frequency limiting resistor R_FL1 is coupled in parallel with the second frequency limiting capacitor C_FL2 between the base contact (B) of the frequency limiting switching element Q_FL and ground. A collector contact (C) of the frequency limiting switching element Q_FL is coupled to a supply voltage VDD. An emitter contact (E) of the frequency limiting switching element Q_FL is coupled to an output node 66 via a second frequency limiting resistor R_FL2. A third frequency limiting capacitor C_FL3 is coupled between the output node 66 and ground. A third frequency limiting diode D_FL3 is coupled in series with a third frequency limiting resistor R_FL3 between a second input node 68 and the emitter contact (E) of the frequency limiting switching element Q_FL, such that an anode of the third frequency limiting diode D_FL3 is coupled to the second input node 68 and a cathode of the third frequency limiting diode D_FL3 is coupled to the third frequency limiting resistor R_FL3. A fourth frequency limiting capacitor C_FL4 and a fourth frequency limiting diode D_FL4 are also coupled in series between the second input node 68 and the emitter contact (E) of the frequency limiting switching element Q_FL, such that an anode of the fourth frequency limiting diode D_FL4 is coupled to the emitter contact (E) of the frequency limiting switching element Q_FL and a cathode of the fourth frequency limiting diode D_FL4 is coupled to the fourth frequency limiting capacitor C_FL4. The cathode of the third frequency limiting diode D_FL3 is coupled to the cathode of the fourth frequency limiting diode D_FL4. Finally, a fifth frequency limiting diode D_FL5 includes an anode coupled to the cathode of the third frequency limiting diode D_FL3 and the fourth frequency limiting diode D_FL4 and a cathode coupled to the collector contact (C) of the frequency limiting switching element Q_FL. Together, the first frequency limiting diode D_FL1, the second frequency limiting diode D_FL2, the first frequency limiting capacitor C_FL1, the second frequency limiting capacitor C_FL2, the first frequency limiting resistor R_FL1, and the first frequency limiting switching element Q_FL may be referred to as clamp circuitry 70, while the third frequency limiting resistor R_FL3, the third frequency limiting diode D_FL3, the fourth frequency limiting diode D_FL4, the fifth frequency limiting diode D_FL5, and the fourth frequency limiting capacitor C_FL4 are referred to as switching indicator signal SW_I monitoring circuitry 72.

Notably, while the clamp circuitry 70 and the switching indicator signal SW_I monitoring circuitry 72 are shown together in the frequency limiting circuitry 50 shown in FIG. 6, they can also be used independently from one another. Further, while a number of specific components are shown in the clamp circuitry 70 and the switching indicator signal SW_I monitoring circuitry 72, any number of different components arranged in a variety of ways may accomplish the functionality of the clamp circuitry 70 and the switching indicator signal SW_I monitoring circuitry 72, all of which are contemplated herein.

Figure 7:
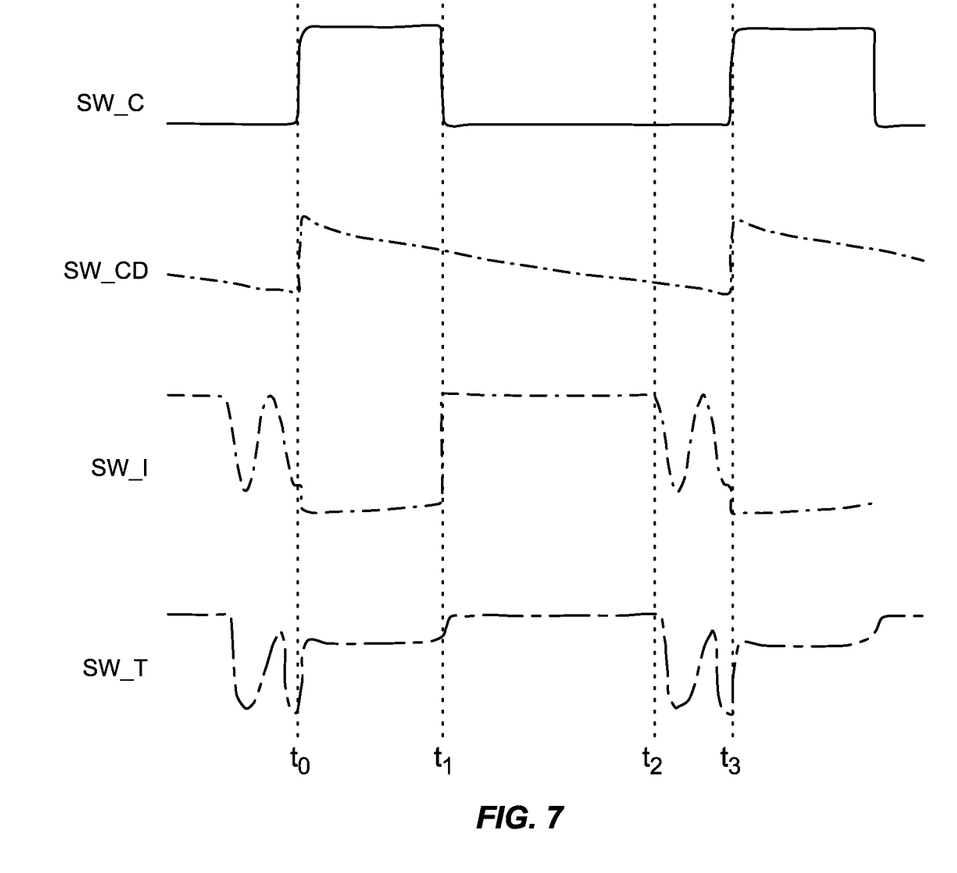
FIG. 7 is a graph illustrating one or more operational parameters of the frequency limiting circuitry shown in FIG. 6 according to one embodiment of the present disclosure.

The operation of the frequency limiting circuitry 50 is now described with reference to FIG. 7, which illustrates waveforms of the various signals in the circuitry. The frequency limiting circuitry 50 receives the switching control signal SW_C at the first input node 64 and the switching indicator signal SW_I at the second input node 68, and outputs the frequency limiting switching trigger signal SW_T at the output node 66. When the switching control signal SW_C transitions from low to high at time $t_0$, the second frequency limiting capacitor C_FL2 is charged through the first frequency limiting capacitor C_FL1 and the first frequency limiting diode D_FL1, thus bringing the voltage at the base contact (B) of the frequency limiting switching element Q_FL up to a portion of the voltage of the switching control signal SW_C defined as the voltage across the second frequency limiting diode D_FL2 less the voltage across the first frequency limiting diode D_FL1. As the voltage across the second frequency limiting capacitor C_FL2 begins to decrease due to the discharge of the first frequency limiting capacitor C_FL1 by the first frequency limiting resistor R_FL1, the voltage at the base contact (B) of the frequency limiting switching element Q_FL, referred to as the decayed switching control signal SW_C, decays at a rate that may be controlled by the various values chosen for the first frequency limiting capacitor C_FL1, the second frequency limiting capacitor C_FL2, and the first frequency limiting resistor R_FL1, as shown in Equation (2):

$$V_{SWCD1} = V_{SWCD0} e^{\frac{-t_{on}}{R_{FL1}(C_{FL1}+C_{FL2})}} \quad (2)$$

Where $V_{SWCD0}$ is the voltage of the decayed switching control signal SW_CD at the base contact (B) of the frequency limiting switching element Q_FL when the switching control signal SW_C initially transitions from low to high at time $t_0$, $V_{SWCD}$ is the voltage of the decayed switching control signal SW_CD thereafter during the ramping decline of the decayed switching control signal SW_CD between time $t_0$ and $t_1$, and $t_{on}$ is the elapsed time that the switching control signal SW_C has been high (in other words, the on time of the switching control signal SW_C). Notably, the decayed switching control signal SW_CD begins to decay immediately after the switching control signal SW_C transitions from low to high, rather than being held high by the switching control signal SW_C, which results in the continuous ramping signal shown in FIG. 7. While the switching indicator signal SW_I becomes negative when the power converter switching element Q_PC is ON due to the primary winding 58 of the power converter transformer T_PC being shorted to ground, the frequency limited switching trigger signal SW_T is held high by the base-to-emitter voltage of the frequency limiting switching element Q_FL.

When the switching control signal SW_C transitions from high to low at time $t_1$, the second frequency limiting capacitor C_FL2 is discharged through the first frequency limiting resistor R_FL1 and the voltage across the first frequency limiting capacitor C_FL1 is reset by the second frequency limiting diode D_FL2. Accordingly, the decayed switching control signal SW_CD continues to decline between time $t_1$ and $t_3$. When the voltage of the decayed switching control signal SW_CD is above the threshold voltage of the frequency limiting switching element Q_FL, the voltage at the output node 66 of the frequency limiting circuitry 50 is clamped at a portion of the supply voltage VDD equal to the decayed switching control signal SW_CD less the base-to-emitter voltage of the frequency limiting switching element Q_FL. Accordingly, the switching control circuitry 48 will not transition the switching control signal from low to high until the switching trigger signal SW_T is below a predetermined triggering voltage $V_{trig}$ of the switching control circuitry 48, as shown in Equations (3) and (4):

$$t_s = t_{on} + t_{off} = t_{on} + R_{FL1} C_{FL2} \ln\left(\frac{V_{B0} e^{\frac{-t_{on}}{R_{FL1}(C_{FL1}+C_{FL2})}}}{V_{trig} + V_{BE}}\right) \quad (3)$$

$$t_s = \frac{C_{FL1}}{C_{FL1}+C_{FL2}} t_{on} + R_{FL1} C_{FL1} \ln\left(\frac{V_{B0}}{V_{trig}+V_{BE}}\right) \quad (4)$$

As shown in Equations (3) and (4), the switching period is significantly less dependent on the on time of the switching control signal SW_C, especially when the value of C_FL1 is smaller than C_FL2. Accordingly, the switching frequency variation is less than conventional solutions even during large changes in the input voltage or load level, which is beneficial to efficiency optimization and electromagnetic interference (EMI) filtering.

Switching losses in the driver circuitry 40 may be further mitigated via the use of valley switching. As shown in FIG. 7, the switching indicator signal SW_I and the switching node voltages, such as the drain voltage of the power converter switching element Q_PC, ring when the power converter diode D_PC finishes conduction due to resonance. If the power converter switching element Q_PC is turned on at the valley point of these resonant voltages, the switching loss is minimized.

The capability of the frequency limiting circuitry 50 to achieve valley switching can be improved by using the topology shown in FIG. 6. As shown in FIG. 7, the switching indicator signal SW_I is high while the power converter switching element Q_PC is OFF, due to the transfer of power from the primary winding 58 of the power converter transformer T_PC to the auxiliary windings. Accordingly, the frequency limited switching trigger signal SW_T is pulled high through the third frequency limiting diode D_FL3 and the third frequency limiting resistor R_FL3, which prevents the switching control circuitry 48 from transitioning the switching control signal SW_C from high to low until the switching indicator signal SW_I rises above a predetermined threshold at time $t_1$. As the magnetic field of the primary winding 58 collapses at time $t_2$ and power is no longer transferred to the auxiliary windings, the switching indicator signal SW_I begins to resonate. The frequency limited switching trigger signal SW_T follows the resonant pattern of the switching indicator signal, but is clamped by the base-to-emitter voltage of the frequency limiting switching element Q_FL as long as the decayed switching control signal SW_C is above the threshold voltage of the frequency limiting switching element Q_FL. Accordingly, the frequency limited switching trigger signal SW_T will not drop to a low enough level to trigger the switching control circuitry 48 to transition the switching control signal SW_C from high to low unless the switching indicator signal SW_I is decreasing while its value is low enough. With the switching indicator signal SW_I monitoring circuitry 72 shown in FIG. 6, the period in which the triggering occurs is only about a quarter of the time of a resonance period, which is a much narrower window for triggering than conventional solutions. Accordingly, valley switching of the driver circuitry 40 can be assured, which results in improvements in the efficiency of the driver circuitry 40.

Figure 8:
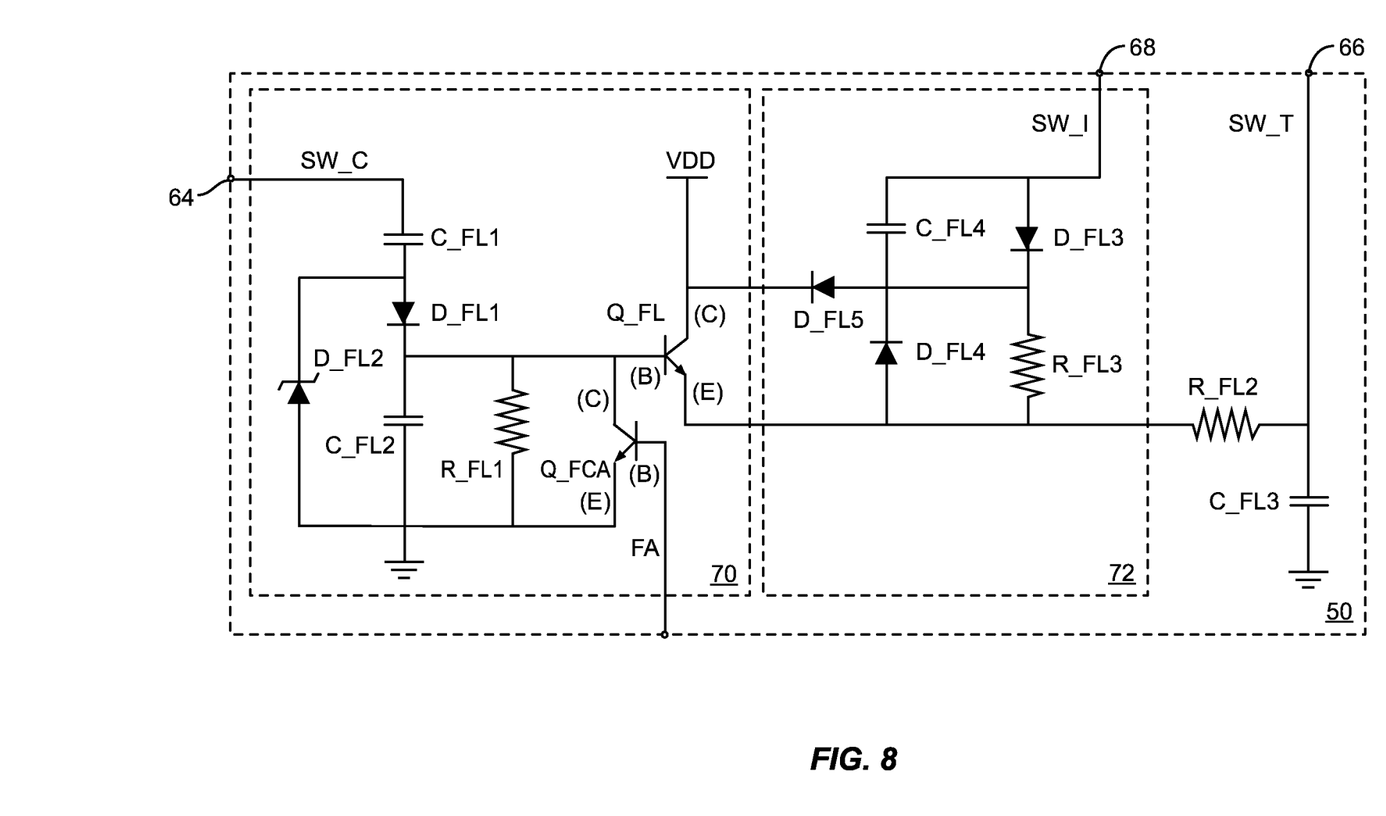
FIG. 8 is a schematic illustrating details of the frequency limiting circuitry shown in FIG. 5 according to an additional embodiment of the present disclosure.

FIG. 8 shows the frequency limiting circuitry 50 according to an additional embodiment of the present disclosure. The frequency limiting circuitry 50 shown in FIG. 8 is substantially similar to that shown in FIG. 7, but further includes a frequency control adjustment transistor Q_FCA including a collector contact (C) coupled to the base contact (B) of the frequency limiting switching element Q_FL, an emitter contact (E) coupled to ground, and a base contact (B) configured to receive a frequency control adjustment signal FCA. By changing the frequency control adjustment signal FCA, the amount of frequency limiting provided by the frequency limiting circuitry 50 may be adjusted by controlling the charge and discharge rate of the first frequency limiting capacitor C_FL1 and the second frequency limiting capacitor C_FL2.

Those skilled in the art will recognize improvements and modifications to the preferred embodiments of the present disclosure. All such improvements and modifications are considered within the scope of the concepts disclosed herein and the claims that follow.

What is claimed is:

1. Driver circuitry comprising:
   power converter circuitry configured to receive and selectively provide an input signal to one or more power conversion components via a power converter switching element to produce a regulated output signal; and
   switching control circuitry coupled to the power converter switching element and configured to provide a switching control signal for controlling the power converter switching element based on a frequency limited switching trigger signal such that the switching control signal is a function of a measure of an on time of the power converter switching element; and
   switching frequency limiting circuitry coupled to the switching control circuitry and configured to receive a switching indicator signal from the power converter circuitry and provide the frequency limited switching trigger signal based on the switching indicator signal and the switching control signal such that:
   when a switching frequency of the power converter switching element is below a predetermined threshold, the switching control signal operates the power converter circuitry in a critical conduction mode; and
   when the switching frequency of the power converter switching element is above the predetermined threshold, the switching control signal operates the power converter circuitry in a discontinuous conduction mode.

2. The driver circuitry of claim 1 wherein the measure of the on time of the power converter switching element is a function of the switching control signal and a switching indicator signal, which indicates a state of the power converter switching element.

3. The circuitry of claim 1 wherein the predetermined threshold is in the range of about 30 kHz to about 100 kHz.

4. The circuitry of claim 1 wherein the power converter circuitry is one of a flyback converter, a buck-boost converter, and a single-ended primary-inductor converter (SEPIC).

5. The circuitry of claim 1 wherein the input signal is an alternating current (AC) signal and the regulated output signal is a direct current (DC) signal.

6. The circuitry of claim 1 wherein the input signal and the regulated output signal are direct current (DC) signals.

7. The circuitry of claim 1 wherein the switching frequency limiting circuitry comprises:
   switching indicator signal monitoring circuitry configured to receive the switching indicator signal; and
   clamp circuitry configured to receive the switching control signal and clamp the switching indicator signal to a predetermined value during a predetermined time period based on the switching control signal, wherein the clamped switching indicator signal is the frequency limited switching trigger signal.

8. The circuitry of claim 7 wherein the frequency limited switching trigger signal is configured to operate the switching control circuitry such that the switching control signal transitions from low to high during a resonant valley of the switching indicator signal.

9. The circuitry of claim 1 wherein the frequency limited switching trigger signal is configured to operate the switching control circuitry such that the switching control signal transitions from low to high during a resonant valley of the switching indicator signal.

10. The circuitry of claim 1 wherein the switching control circuitry is a critical mode switching controller.

11. The circuitry of claim 1 wherein the switching indicator signal is indicative of a voltage across the power converter switching element.

12. A lighting fixture comprising:
- a solid state light source including a plurality of light emitting diodes (LEDs); and
- driver circuitry coupled to the solid state light source and comprising:
  - power converter circuitry configured to receive and selectively provide an input signal to one or more power conversion components via a power converter switching element to produce a regulated output signal for driving the solid state light source; and
  - switching control circuitry coupled to the power converter switching element and configured to provide a switching control signal for controlling the power converter switching element based on a frequency limited switching trigger signal such that the switching control signal is a function of a measure of an on time of the power converter switching element; and
  - switching frequency limiting circuitry coupled to the switching control circuitry and configured to receive a switching indicator signal from the power converter circuitry and provide the frequency limited switching trigger signal based on the switching indicator signal and the switching control signal such that:
    - when a switching frequency of the power converter switching element is below a predetermined threshold, the switching control signal operates the power converter circuitry in a critical conduction mode; and
    - when the switching frequency of the power converter switching element is above the predetermined threshold, the switching control signal operates the power converter circuitry in a discontinuous conduction mode.

13. The lighting fixture of claim 12 wherein the measure of the on time of the power converter switching element is a function of the switching control signal and a switching indicator signal, which indicates a state of the power converter switching element.

14. The circuitry of claim 12 wherein the predetermined threshold is in the range of about 30 kHz to about 100 kHz.

15. The circuitry of claim 12 wherein the power converter circuitry is one of a flyback converter, a buck-boost converter, and a single-ended primary-inductor converter (SEPIC).

16. The circuitry of claim 12 wherein the input signal is an alternating current (AC) signal and the regulated output signal is a direct current (DC) signal.

17. The circuitry of claim 12 wherein the input signal and the regulated output signal are direct current (DC) signals.

18. The circuitry of claim 12 wherein the switching frequency limiting circuitry comprises:
- switching indicator signal monitoring circuitry configured to receive the switching indicator signal; and
- clamp circuitry configured to receive the switching control signal and clamp the switching indicator signal to a predetermined value during a predetermined time period based on the switching control signal, wherein the clamped switching indicator signal is the frequency limited switching trigger signal.

19. The circuitry of claim 18 wherein the frequency limited switching trigger signal is configured to operate the switching control circuitry such that the switching control signal transitions from low to high during a resonant valley of the switching indicator signal.

20. The circuitry of claim 12 wherein the frequency limited switching trigger signal is configured to operate the switching control circuitry such that the switching control signal transitions from low to high during a resonant valley of the switching indicator signal.

21. The circuitry of claim 12 wherein the switching control circuitry is a critical mode switching controller.

22. The circuitry of claim 12 wherein the switching indicator signal is indicative of a voltage across the power converter switching element.

* * * * *